Figure 1:
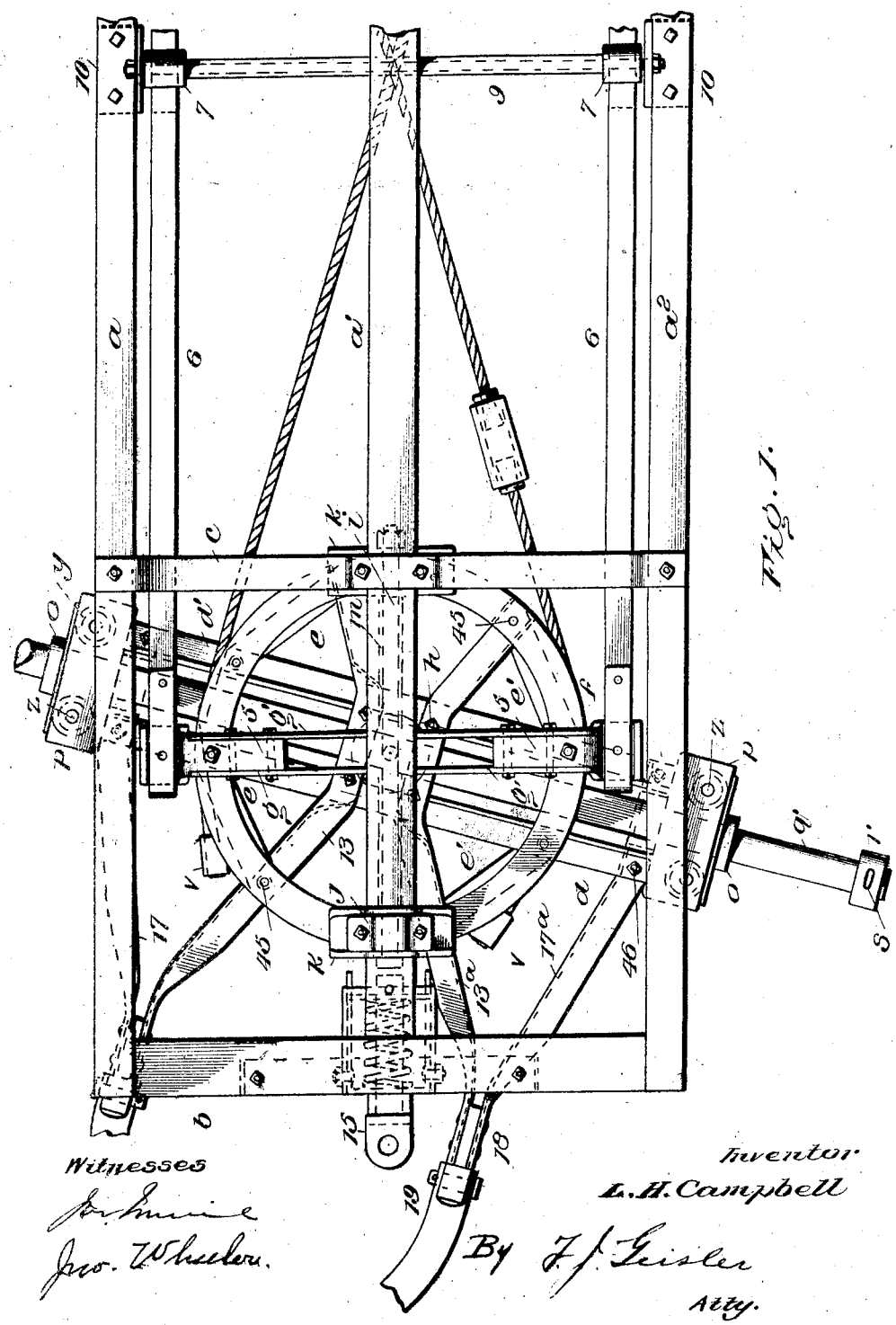

No. 891,206. PATENTED JUNE 16, 1908.
L. H. CAMPBELL.
EQUALIZED OSCILLATING GEAR FOR ROAD VEHICLES.
APPLICATION FILED DEC. 31, 1904.

8 SHEETS—SHEET 1.

Witnesses

Inventor
L. H. Campbell
By J. J. Geisler
Atty.

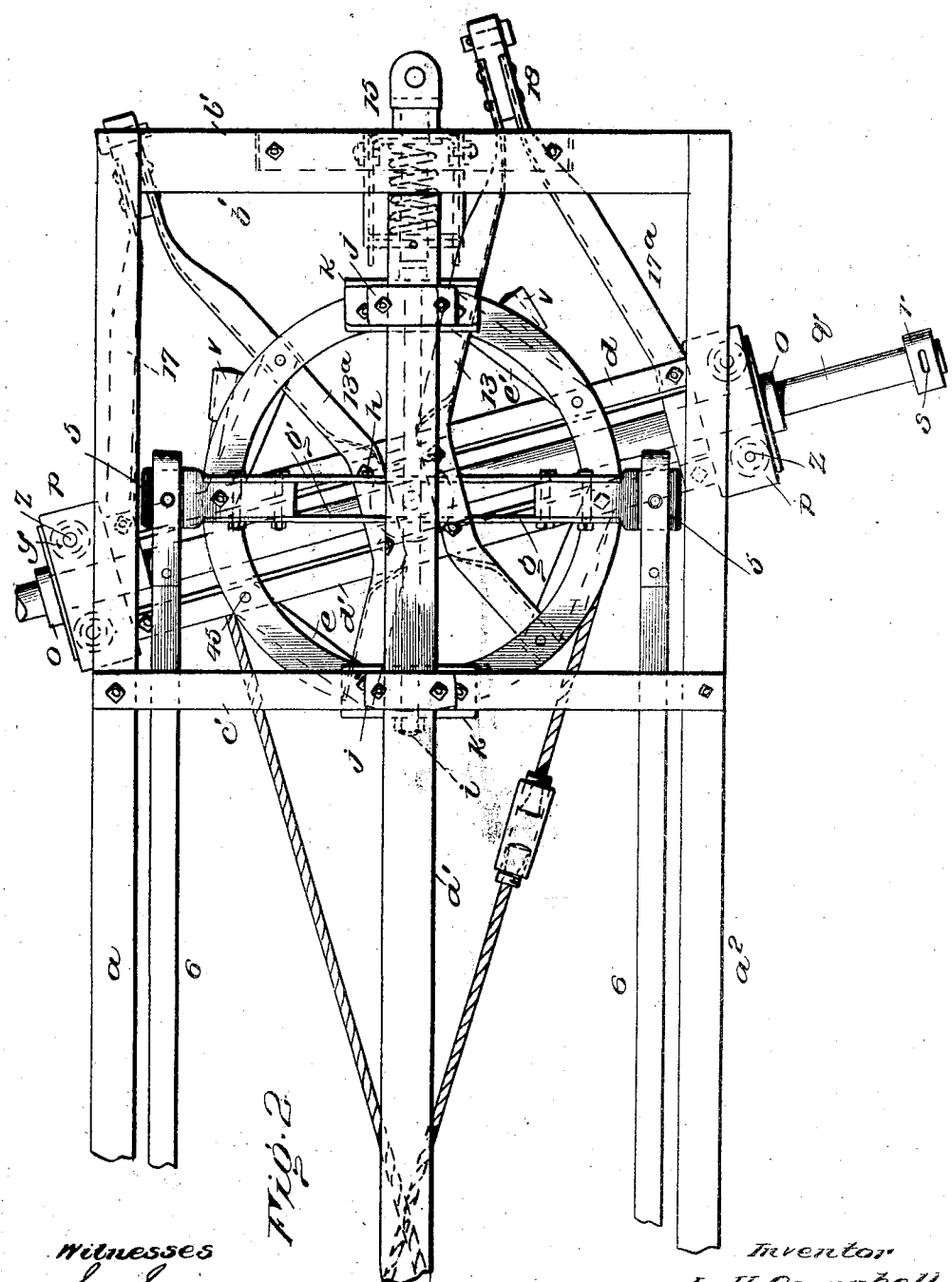

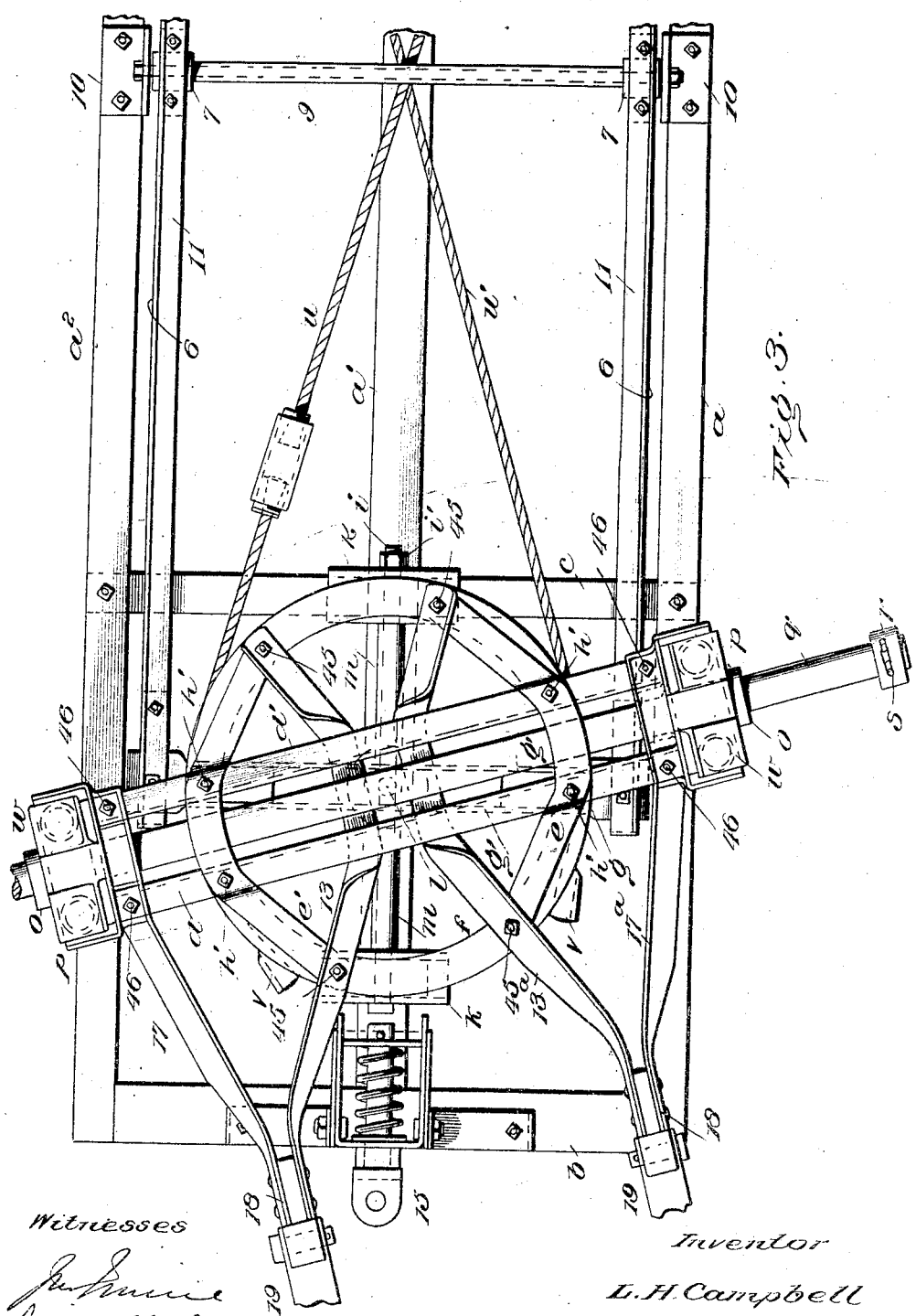

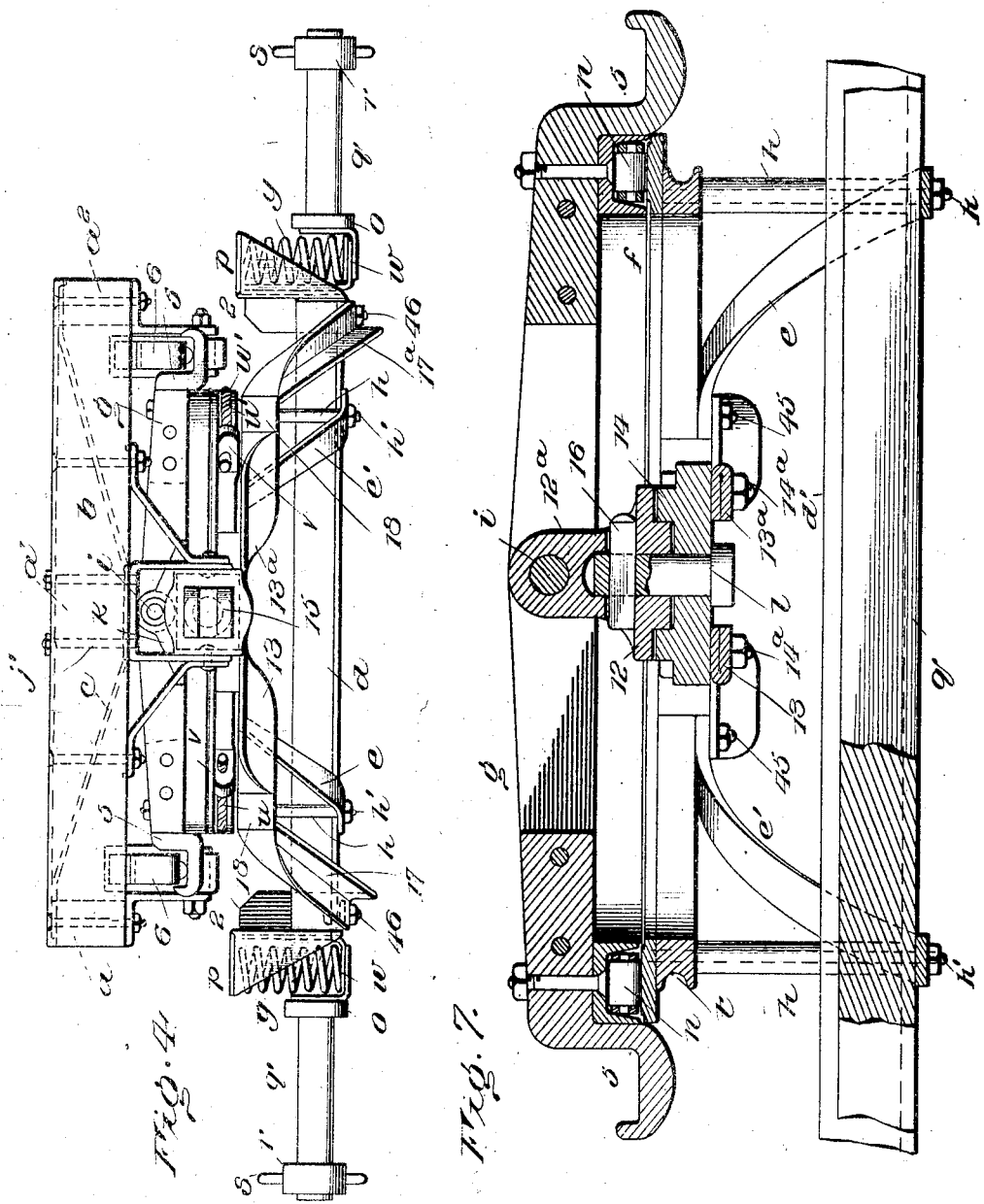

No. 891,206. PATENTED JUNE 16, 1908.
L. H. CAMPBELL.
EQUALIZED OSCILLATING GEAR FOR ROAD VEHICLES.
APPLICATION FILED DEC. 31, 1904.
8 SHEETS—SHEET 5.
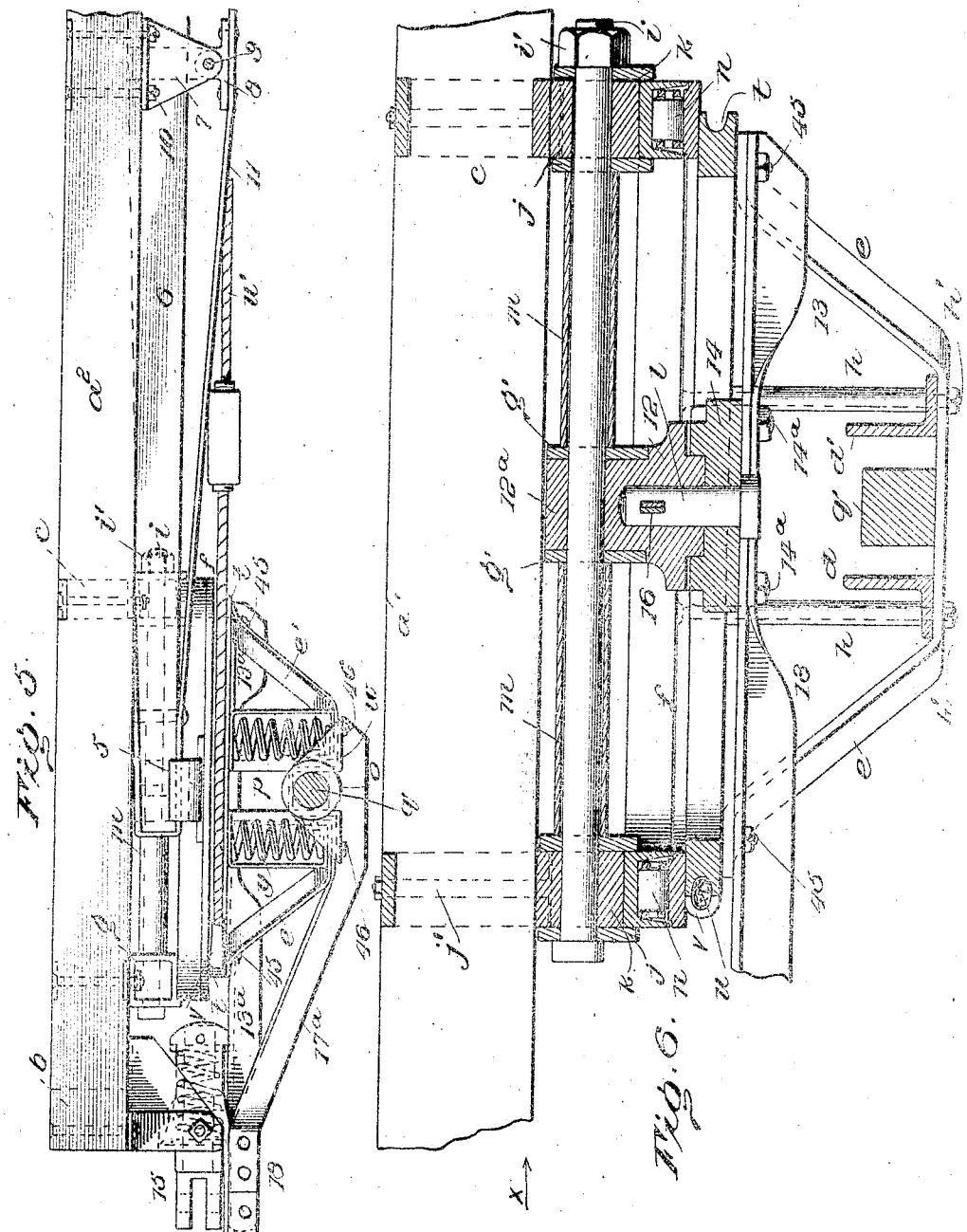
Witnesses
Inventor
L. H. Campbell
By T. J. Geisler
Atty No. 891,206.
PATENTED JUNE 16, 1908.
L. H. CAMPBELL.
EQUALIZED OSCILLATING GEAR FOR ROAD VEHICLES.
APPLICATION FILED DEC. 31, 1904.
8 SHEETS—SHEET 6.
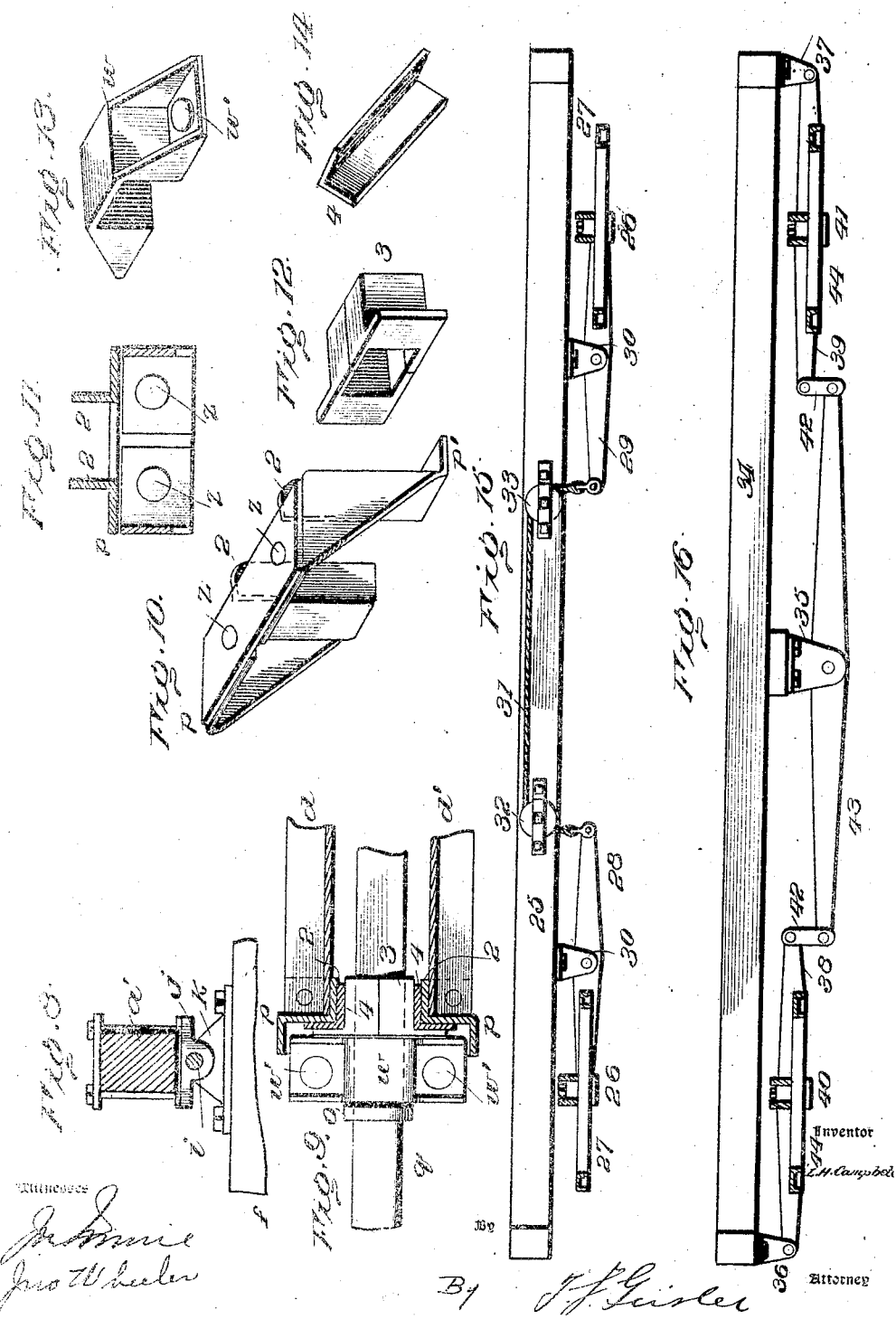

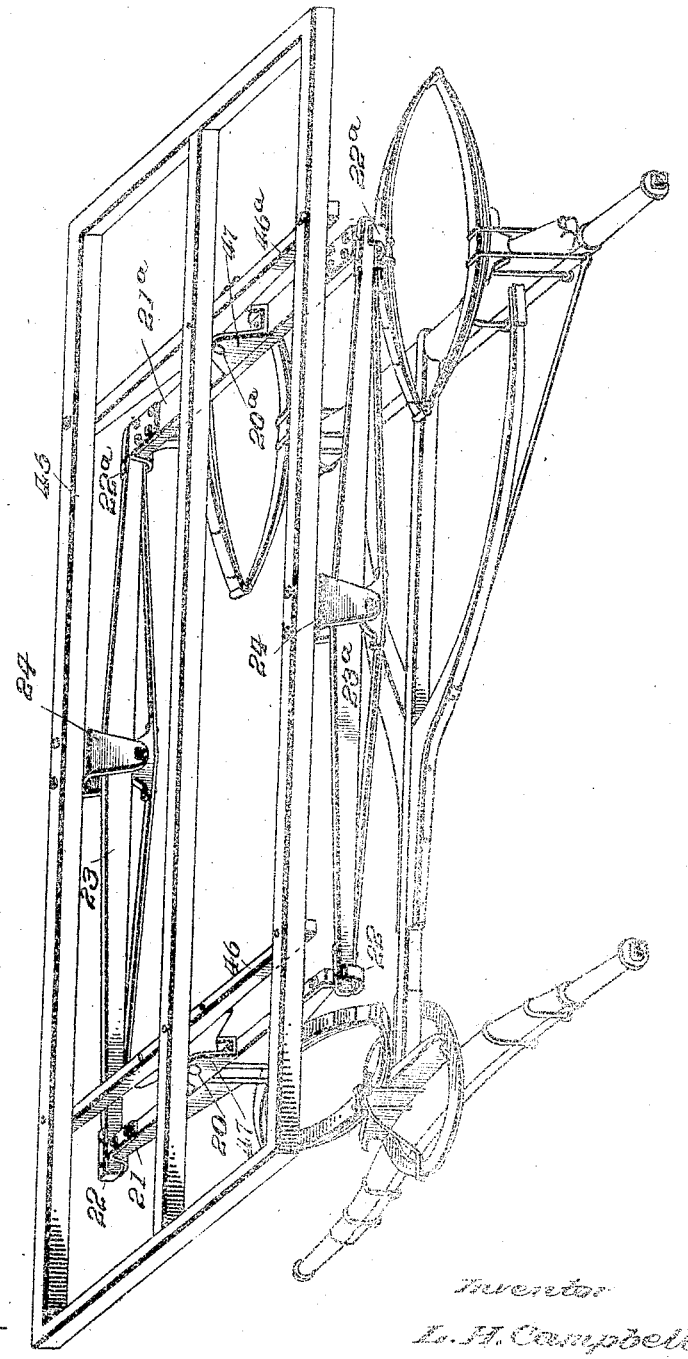

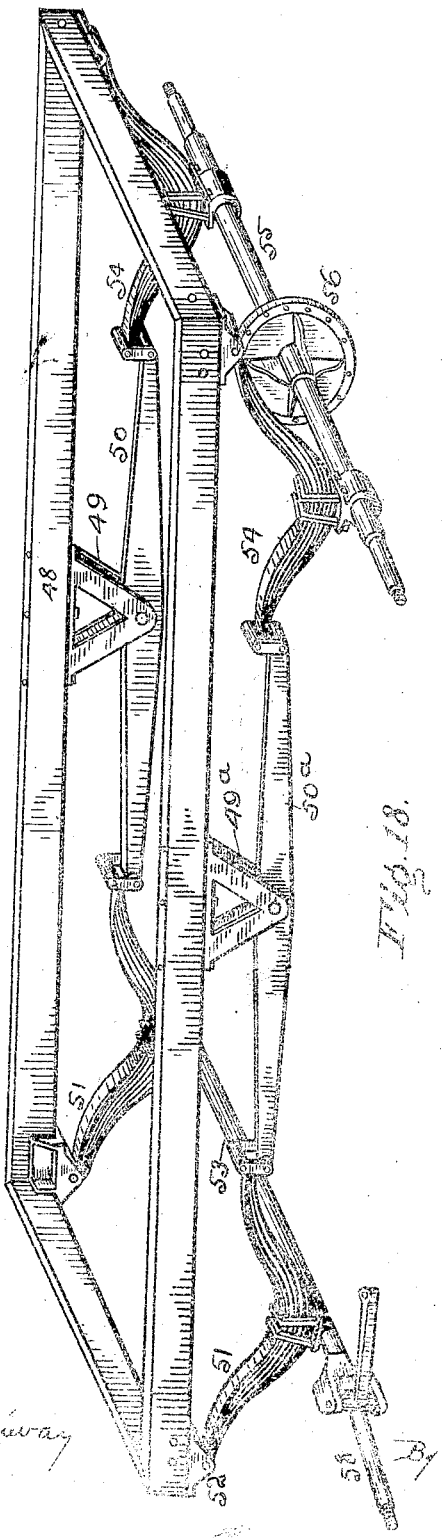

UNITED STATES PATENT OFFICE.

LOUIS H. CAMPBELL, OF PORTLAND, OREGON, ASSIGNOR OF ONE-HALF TO A. A. LINDSEY, TRUSTEE, OF PORTLAND, OREGON.

EQUALIZED OSCILLATING GEAR FOR ROAD-VEHICLES.

No. 891,206.   Specification of Letters Patent.   Patented June 16, 1908.

Application filed December 31, 1904. Serial No. 239,218.

*To all whom it may concern:*

Be it known that I, LOUIS H. CAMPBELL, a citizen of the United States, and a resident of Portland, in the county of Multnomah and State of Oregon, have invented a new and useful Improvement in Equalized Oscillating Gear for Road-Vehicles, of which the following is a specification, reference being had to the accompanying drawings as constituting a part thereof.

My invention relates to means for preventing undue torsional strain in the vehicle frame while hauling a load over a rough section of road.

To this end the object of my invention is to so construct the running gear of a vehicle that it is enabled to adapt itself to the unevenness or roughness in the road surface. That is to say my running gear is made with equalizing devices which operate to neutralize the torsional strain imposed by either of the wheels dropping into a depression, or climbing an elevation in the road surface, and the consequential incline of the wagon body and shifting of the center of gravity of the weight of the load carried.

My improvement is as beneficial in the construction of vehicles designed for passenger services as it is in the construction of freight vehicles. When applied to passenger vehicles, the same are rendered more easy riding. When applied to freighting vehicles, they are rendered more easy running and their life is greatly prolonged.

I accomplish my object by the devices illustrated in the drawings and hereinafter described.

In said drawings, Figures 1 and 2 taken together represent a plan of the front and rear sections of the running-gear of a vehicle of the low bodied type, provided with front and rear pivoting axles and incorporating my improvement. Fig. 3 is an inverted plan of the forward half of the vehicle body shown in Fig. 2, the inverted plan of the rear half not shown would be a duplicate of the half shown; Fig. 4 is an end elevation (of either end) of the vehicle shown in the preceding figures; Fig. 5 is a side elevation of the front section of said vehicle with drawbar removed; Fig. 6 is a central longitudinal section of one of the running gear; Fig. 7 is a transverse section of the wheel gear, of either end of the vehicle below line pointed by arrow $x$ in Fig. 6; Fig. 8 is a cross section of the central member of the vehicle frame showing one of the boxes in which are journaled the ends of the oscillating pin $i$; Fig. 9 is a partial plan section on a line parallel with the upper face of the axle $q$, in Fig. 4, and illustrates the means for mounting the vehicle on the axles; Fig. 10 is a perspective of one of the pedestals $p$, an end elevation of which is seen in Fig. 4; Fig. 11 is an inverted plan section of said pedestal $p$; Figs. 12, 13 and 14 are details of construction to be later more fully described; Figs. 15 and 16 are diagrammatic illustrations of different modes of application of my equalizing devices; Fig. 17 shows my invention applied to a vehicle made with rigid rear axle, and Fig. 18 is a perspective showing my invention applied to the running gear of a vehicle of the automobile type in which the inner parts of both axles are fixed in parallel transverse positions in relation to the body, and the steering is accomplished by short pivoted outer axle-parts.

The letters and numerals designate the parts referred to.

The running gear shown in Figs. 1 to 16 comprises front and rear pivoting axles and drawheads 15, adapting the vehicle to be coupled to each other at either end in train, and to be run in either direction. These features are, however, of no importance to my invention herein described; I show and describe the same merely to illustrate the scope and application of my present invention.

As shown in said Figs. 1 to 16, the frame of my vehicle consists of three longitudinal sills, $a$, $a'$, $a^2$, and front and rear transverse end sills $b$, $b'$, and transverse members $c$, $c'$, which members, in the particular type of vehicles shown in said figures, must be in the form of an inverted arch bar as shown in dotted outline in Fig. 4, so as to leave proper clearances for the oscillating ends of the equalizing bars 6, 6.

On both ends of the body frame are secured pivoting wheel gear of the platform type. Such wheel gear are alike in construction. Each comprises parallel members $d$, $d'$, secured by braces $e$, $e'$, and posts $h$, to and supporting the lower circle of the fifth wheel $f$. (See Fig. 6.) The upper member of the fifth wheel is rigidly secured to the under side of and supports a bolster $g$; and said wheel gear is connected to the central sill $a'$ of the body by means adapting the body and the wheel gear to oscillate transversely independently of each other. Such connection in the type of vehicle referred to is effected by means of an oscillating pin $i$, extending through the bolster $g$, the ends of which pin are journaled in hinge lugs $j$, bolted by bolts $j'$ on the under side of the central sill $a'$, and shoes $k$, centrally arranged within the hinge-lug $j$ and made with perforated flanges, by which said shoes are bolted on the upper member of the fifth wheel, as shown in Fig. 8. The lower member of the fifth wheel rotates on a short king bolt $l$. On the sections of the oscillating pin $i$ intermediate of the bolster $g$ and shoes $k$ $k$, are sleeves $m$, $m$. See Fig. 6. $n$, $n$, are the common roller bearings of the fifth wheel $f$.

The axle $q$, is supported at its two ends between the members $d$, $d'$, by pedestals $p$, and specially contrived means, details of which are shown in Figs. 9 to 14. Briefly described these details consist of the pedestals $p$ made with supporting-lugs $p'$ by which the pedestals are rigidly attached to the ends of the parallel members $d$, $d'$, which ends are supported by the pedestals. On the ends of the axle $q$ are placed saddles $w$, (see Fig. 13). The saddles are made with spring retaining studs $w'$ by which to hold the lower end of the coil springs $y$; and the heads of the rivets $z$ on the under sides of the top of the pedestals $p$, are made large, so as to afford ample hold for the upper ends of the coil springs $y$. The pedestals $p$ are made with integral vertical members or jaws 2, which are positioned within the two parallel members $d$, $d'$ as shown in Fig. 9. On the axle ends are placed axle shoes 3, made in two parts (see Fig. 12) in the shape of a box. Between the shoes 3 and the jaws 2 of the pedestals are placed angle plates (see Fig. 14) made like sections of angle irons. The shoes 3 and 4 receive the wear otherwise received by the axle sides and pedestal-jaws 2.

The described means for supporting my vehicle axles are made the subject of a separate application for letters patent.

The bolsters $g$ are of the construction more clearly shown in Figs. 6 and 7. The same consists of two plates $g'$ between the ends of which are rigidly secured stirrups 5, 5, in which are supported the ends of the equalizing bars 6, 6. The equalizing bars are arranged within the outside members $a$ $a^2$ of the body frame. Such equalizing bars are made of greater width in their middle section than at their ends and are provided with the truss rods 11. On the latter are fastened boxes 8 in which is journaled the transverse oscillating shaft 9, the ends of which shaft are supported in hangers, 10, 10' secured to the under side of the members $a$, $a^2$ of the vehicle frame. To strengthen the parts, the equalizing bars 6 are provided with straps 7, which encompass the middle part of the equalizing bars, and have projecting perforated ends through which the ends of the shaft 9 extend, and thus hingedly connecting the parts.

Centrally between the two bolster plates $g'$ is clamped the lug $12^a$ or the male part of center casting 12, the clamping being effected by the tightening of the nut $i'$ of the oscillating pin $i$ and thus causing the sleeves $m$ to force the parts together. The female part 14 of the center casting is bolted to hounds 13, $13^a$ of the wheel gear. The king bolt $l$ is secured in place by a split pin 16. The two ends of the axle $q$ are each made with fixed collars $o$, and removable collars $r$ held in place by split pins $s$.

Underlying the lower members of the fifth wheels $f$, of the front and rear wheel gear, are two grooved segmental circles $t$, one at each side, secured in place by the bolts $h'$ passing through the posts $h$, and by bolts 45 passing through the extremities of the braces $e$, $e'$. See Fig. 6. In said grooved segments lie the ends of the connecting cables $u$, $u'$, said segments being made with lugs $v$, $v$, in which to secure said cable ends.

17, $17^a$, are pedestal braces, arranged substantially parallel to the hounds 13, $13^a$. To the extremities of said braces and hounds are riveted draft eyes 18, 18 to which draft eyes are attached the forked extremities of the draft attachments 19.

As far as described my invention is shown as applied to a vehicle provided with rear pivoting axle, that is, the rear axle also swivels on a fifth wheel; and the draft appliances are attachable to, and the vehicles may be drawn from either end. I have described my invention as applied to this construction in the first instance, however, merely because it represents the more intricate application of my invention.

Below I will describe my invention applied to a vehicle made with a fixed rear axle.

The operation of the equalizing devices will be substantially the same in every case. The effect of such operation is as follows:—In every vehicle to which my invention is applied both the front and the rear wheel gears must be arranged to oscillate transversely at their centers; and operative connections, of the lever principle, must also be provided between the ends of the front and rear axles on each side of the vehicle body, to communicate the oscillation of one wheel gear relatively to the other wheel gear. And the effect obtained by such construction, as a whole, is to keep constant the wheel-load carried by each wheel. That is to say, the oscillation of the front wheel gear is transmitted by the centrally fulcrumed equalizing bars 6, 6, to the rear wheel gear, and causes the latter to be relatively inclined in an opposite direction to the same degree as the front wheel gear. In practice, however, since all the wheels rest on an immovable base, the rear wheel gear is not, in fact, actually inclined as described, but instead the vehicle body is thrown into an incline, and the rear wheel gear merely assumes a relatively inclined position.

Bearing now in mind that the fulcrum points of the oscillating wheel-gear and the equalizing bars 6, 6, are respectively situated in the longitudinal and transverse centers of the vehicle body, it is self evident that the important beneficial results obtained by my improved vehicle gear are:—The degree of incline imposed on either front or rear wheel gear, because of a depression or elevation in the road surface is greatly reduced, in its relative effect upon the position of the vehicle body; and the degree of the shifting of the center of gravity of the load carried by the vehicle is greatly reduced comparatively to the effect of the same road conditions upon vehicles of the ordinary construction. The weight of the load is continually evenly distributed over the entire wheel gear.

In Figs. 15 and 16 are shown two diagrammatic examples of a modification in the operative connections between the lateral ends of the front and rear oscillating wheel gear. An inspection of the figures will show however that the main principles and equalizing effect of my improvement above described are retained in both cases. In Fig. 15, my improvement is shown applied to a vehicle gear of light construction, having great length of wheel base. The platform frame 25 is supported on front and rear wheel gear of which the bolsters 26, 26, and part of the fifth wheels 27 are alone shown. The long equalizing bars 6, 6, and the hangers or bearers 10 for the same shown in the previous examples, are in this instance replaced by equalizing bars made in two short sections 28, 29, suspended in hangers 30, from the frame 25, and the inner ends of said bars 28, 29, are connected by means of cables 31 running over sheaves 32, 33.

The difference in construction in the example illustrated in Fig. 16 is:—The vehicle frame 34 is supported both at the center and its extremities by means of the hangers 35, 36, and 37. In this case bars 38, 39, are fulcrumed in the extremities of the bolsters 40, 41, of the wheel gear, and the inner ends of said bars are connected by links 42, with the extremities of equalizing bars 43, fulcrumed in the hangers 35. 44 represents sections of the fifth wheels. It will be further observed that in the type of construction shown in Fig. 16, the four extremities or corners of the body frame 34 are given direct support by the hangers, 36, 37, which may be found of practical value, where the vehicle is designed for special work.

In Fig. 17 my improvement is shown applied to the three-spring vehicle type, commonly found in what are called "express wagons", the front wheel-gear of which alone swivels.

Since my improvement concerns the equalizing features only, I will confine my description to the arrangement of the parts thereby affected. The body-frame 45 is provided with transverse members 46, 46$^a$. The bolsters 21, 21$^a$, of the front and rear wheel-gear are each provided with a box 47, in which are pivotally supported the two ends of the frame 45, by longitudinally arranged hinge pins 20, 20$^a$, so as to adapt the said frame 45, to have transverse oscillation. And the bolsters 21, 21$^a$, are provided with stirrups 22, 22$^a$, at their extremities, engaged by fulcrumed equalizing bars 23, 23$^a$ pivotally supported from the main frame by hangers 24, 24. The details of construction in other respects are such as are common to three spring vehicles.

From the foregoing description, the beneficial results attainable by my improvement are clearly distinguishable from the effects obtainable from the use of springs. In the first place, the degree of oscillation of the vehicle body, caused by inequalities in the road surface is only slightly reduced by the springs. And furthermore there is no equalizing effect, accurately so termed, obtainable by the mere use of springs; because the springs act individually, and the undue stress imposed upon either spring is not relieved until such stress has been distributed through the medium of the vehicle frame to the other springs, in doing which the very torsional strain is imposed on the vehicle body which it is most desirable to avoid. In my improved vehicle gear, on the other hand, the vehicle body is supported by devices which not only distribute the weight of the load as if suspended on a balance, but the oscillations are themselves greatly reduced in degree, so that depressions and elevations in the road surface are easily passed over which ordinarily would impose quite an extreme oscillation, and strain on the vehicle. The use of springs, in my gear is, in fact, a mere auxiliary element. Nevertheless, to complete my illustrations of the application of my invention to another well known type of vehicle, I will now refer to the automobile type shown in Fig. 18. This represents a vehicle body-frame 48, to which are centrally affixed hangers 49, 49$^a$, pivotally holding equalizing bars 50, 50$^a$, the front ends of which are connected with a pair of springs 51, the outer ends, 52, of which support the forward corners of the vehicle body. To the springs 51 is affixed a rigid axle 53. A similar arrangement for the rigid rear axle 55 is effected by springs 54 and their connections. 56 represents the compensating gear of the power transmission to the drive wheels; and the steering is accomplished by means of the well known short pivoted axle-ends 58. In this example, it is to be observed, there are no parts corresponding to the bolster and longitudinal oscillating connections thereof with the vehicle body; but the axles 53, 55 in their relations with the springs 51, 54 will oscillate relatively to each other and the vehicle body the same as in the types of vehicles first above described.

To understand the principle of my invention it is necessary to bear in mind that by the herein described manner of mounting the vehicle-body on the wheel-gear four or more points of suspension are obtained, while in the ordinary vehicle construction a three point suspension is all that is feasible; and consequently in the latter case the transverse oscillation of the body is at all times controlled by the axial incline of one pair of wheels only, usually the rear pair, and the whole of such axial inclination is imparted to the body, while in the invention of applicant the motion is obviously divided by the lever-like connections, in coöperation with which the body substantially occupies the position of a fulcrum, and in consequence receives only to a partial degree the oscillation communicated from one wheel axle to the other.

I claim:

1. The combination in a road vehicle comprising a body-frame, front and rear wheel-gear, means supporting the body-frame on the wheel-gear and arranged to allow each pair of wheels to oscillate transversely independently of the body-frame on an axis lying in the longitudinal center of the latter, and lever-like connections between such wheel-gear and the body-frame arranged to transmit the axial incline of either pair of wheels, due to inequalities in the road surface, relatively to the other pair of wheels, through the medium of the body.

2. The combination in a road vehicle comprising a body-frame, front and rear wheel-gear, means pivotally connecting the said wheel-gear to the body-frame and arranged to allow either pair of wheels to oscillate transversely on a central axis independently of the body-frame, and lever-like connections between such wheel-gear and the body-frame arranged to transmit the axial incline of either pair of wheels, due to inequalities in the road surface, relatively to the other pair of wheels, through the medium of the body.

3. The combination in a road vehicle comprising a body-frame, front and rear wheel-gear, central longitudinal oscillating pins and bearings therefor whereby the gear of each pair of wheels is pivotally connected to the body-frame and arranged to oscillate transversely independently of the body-frame, and lever-like means connecting the body-frame with the lateral extremities of the front and rear wheel-gear and arranged to transmit the axial incline of either pair of wheels, due to inequalities in the road surface, relatively to the other pair of wheels, through the medium of the body.

In testimony whereof, I have hereunto affixed my signature in the presence of two witnesses.

LOUIS H. CAMPBELL.

Witnesses:
   T. J. GEISLER,
   R. R. DUNIWAY.